Feb. 12, 1935.  K. F. GALLIMORE  1,991,349
GEAR DRIVE AND INDICATING MEANS THEREFOR
Filed Feb. 8, 1932   2 Sheets-Sheet 1
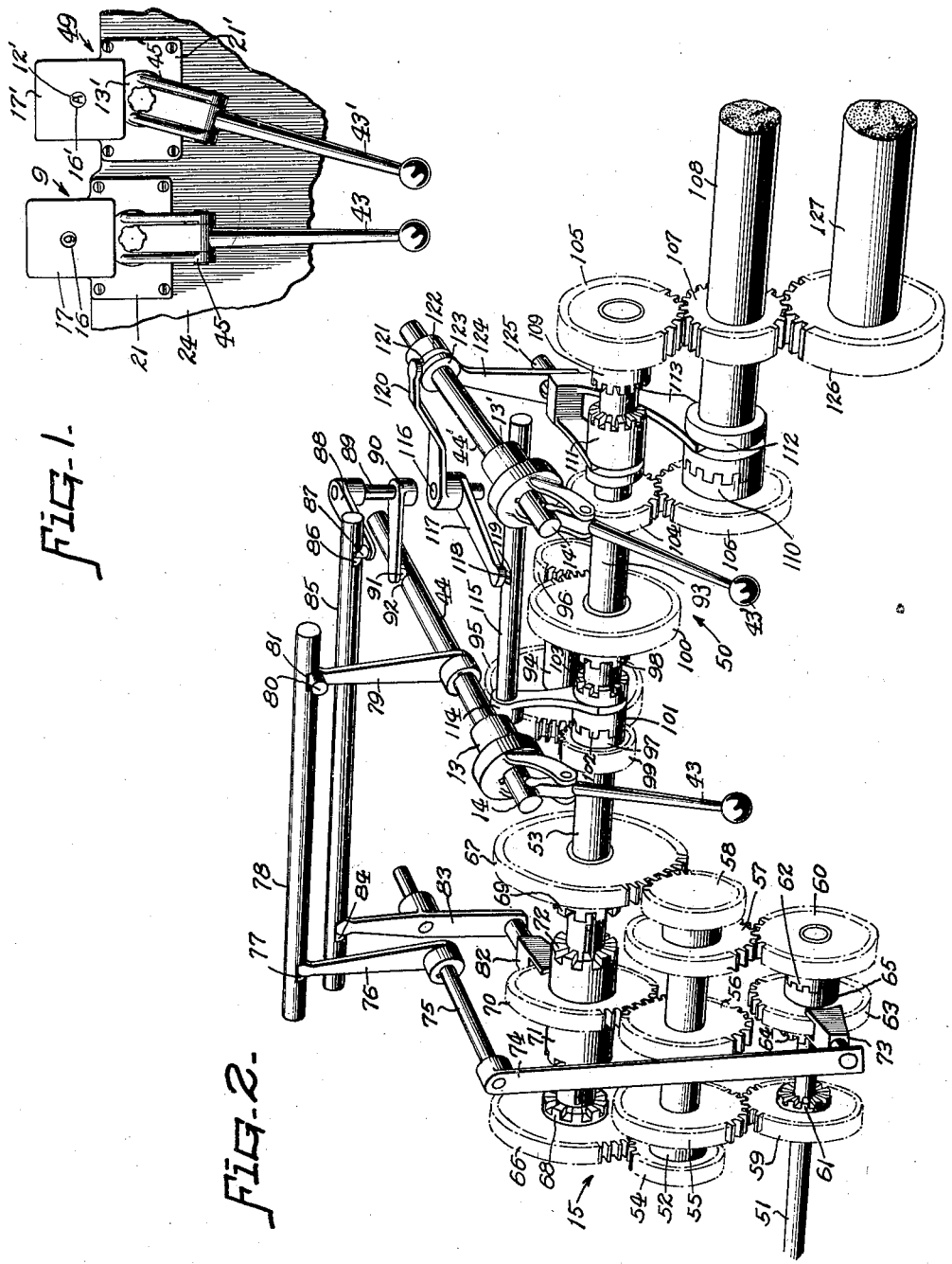
INVENTOR
KEITH F. GALLIMORE
BY
Chindahl, Parker & Carlson
ATTORNEY Feb. 12, 1935.  K. F. GALLIMORE  1,991,349
GEAR DRIVE AND INDICATING MEANS THEREFOR
Filed Feb. 8, 1932   2 Sheets—Sheet 2
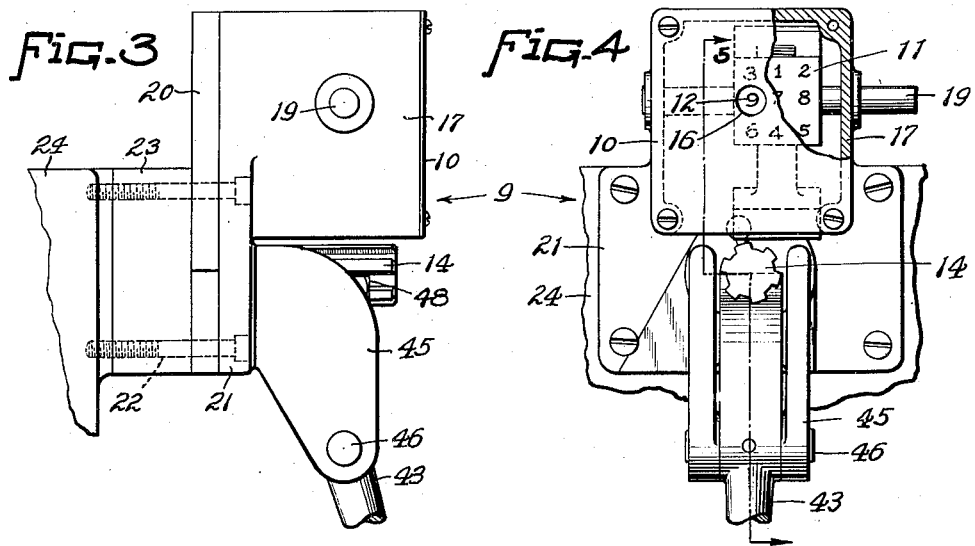
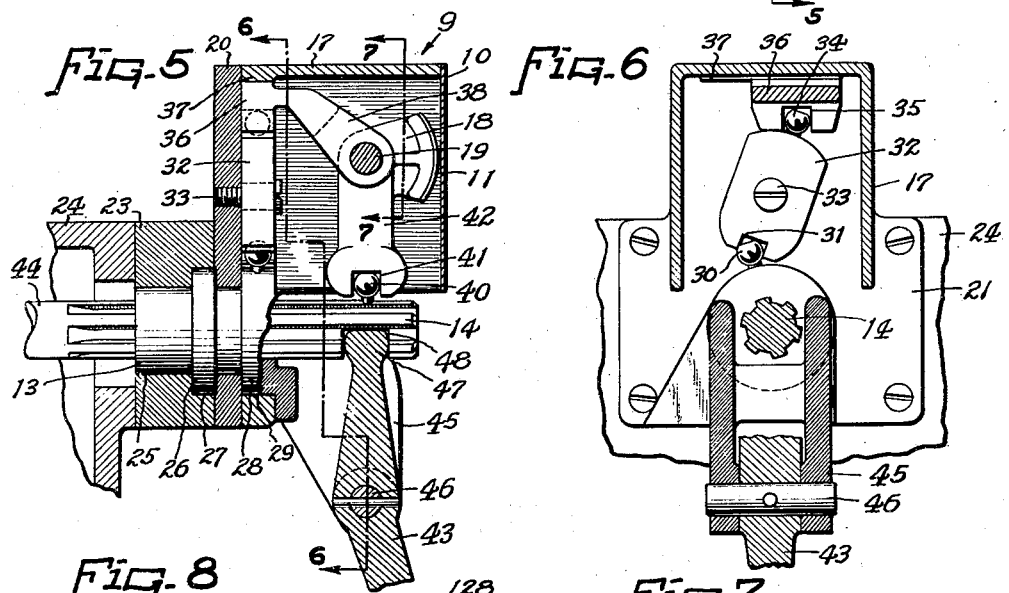
Fig. 8
| SPINDLE SPEEDS IN REVOLUTIONS PER MINUTE | | | | | | | | | | | |
|---|---|---|---|---|---|---|---|---|---|---|---|
| | | | 3 1 2 | | | | | | | C | D |
| | | | 9 7 8 | | | | | | | | |
| | | | 6 4 5 | | | | | | | A | B |
| 9 | 8 | 7 | 6 | 5 | 4 | 3 | 2 | 1 | | | |
| 21 | 19 | 17 | 15 | 13 | 12 | 10.5 | 9.3 | 8.3 | MAIN | A | |
| 64 | 56 | 51 | 45 | 39 | 36 | 32 | 28 | 25 | AUX. | | |
| 61 | 54 | 49 | 43 | 38 | 34 | 30 | 27 | 24 | MAIN | B | |
| 183 | 161 | 146 | 129 | 113 | 103 | 91 | 79 | 72 | AUX. | | |
| 174 | 153 | 138 | 123 | 108 | 97 | 86 | 75 | 69 | MAIN | C | |
| 523 | 460 | 416 | 368 | 323 | 293 | 259 | 227 | 206 | AUX. | | |
| 500 | 440 | 398 | 352 | 309 | 280 | 248 | 217 | 197 | MAIN | D | |
| 1500 | 1320 | 1195 | 1055 | 927 | 840 | 743 | 652 | 592 | AUX. | | |
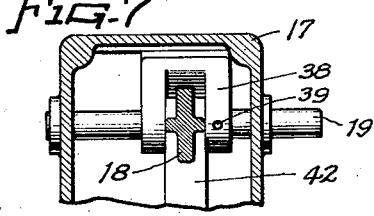
INVENTOR
*KEITH F. GALLIMORE*
BY
*Chindahl, Parker & Carlson*
ATTORNEY Patented Feb. 12, 1935

1,991,349

UNITED STATES PATENT OFFICE 1,991,349

GEAR DRIVE AND INDICATING MEANS THEREFOR

Keith F. Gallimore, Fond du Lac, Wis., assignor to Giddings & Lewis Machine Tool Co., Fond du Lac, Wis., a corporation of Wisconsin Application February 8, 1932, Serial No. 591,738

7 Claims. (Cl. 116—124)

The present invention relates generally to improvements in variable-speed gear drives, such for example as are adapted for use in machine tools, and has for one of its primary objects the provision of novel means for indicating the position of adjustment thereof.

An important object is to provide a new and improved unitary device for indicating the composite result of the selective adjustment of two elements which are operatively movable, jointly and independently, into various relative positions to effect any one of a plurality of speed-changes in a variable-speed mechanism.

Further objects and advantages, which will become apparent as the description proceeds, reside in various novel features of construction and arrangement embodied in the actuators for adjusting said mechanism and the unitary indicating devices.

In the accompanying drawings, Figure 1 is a front elevational view of two indicating devices embodying various features of the invention.

Fig. 2 is a perspective view of a variable-speed gear drive to which the indicating devices of Fig. 1 are adapted to be applied.

Fig. 3 is a fragmentary side elevational view of one of the indicating devices.

Fig. 4 is a fragmentary front elevational view, partially in section, of the device shown in Fig. 3.

Fig. 5 is a fragmentary sectional view taken along line 5—5 of Fig. 4.

Fig. 6 is a fragmentary sectional view taken along line 6—6 of Fig. 5.

Fig. 7 is a fragmentary sectional view taken along line 7—7 of Fig. 5.

Fig. 8 is a front elevational view of the speed index.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the variable-speed drive constituting the preferred embodiment of the invention comprises an indicating device 9 shown in detail in Figs. 3 to 7. The device 9 has a fixed member 10 and a movable member 11 operatively associated therewith. One member, in the present instance the member 10, constitutes an indicator, while the other member, namely the member 11, is in the form of a gauge having indicia 12 thereon movable selectively into registration with the indicator to identify any one of a plurality of relative gauge positions. The gauge 11 is operatively connected for single or composite actuation to two independently movable elements 13 and 14 in turn operatively movable selectively into any one of a series of relative positions corresponding to the available changes in a multiple-speed mechanism 15. The indicia 12 correspond in number to the available speed changes, and are arranged on the gauge 11 to indicate, in cooperation with the indicator 10, the particular speed for which the mechanism 15 may on each occasion be adjusted. Obviously, the number and arrangement of the indicia 12 depend on the character of the speed change mechanism 15.

In the preferred form of the device 9, the indicator 10 consists of a flat plate which is formed centrally with a circular sight opening 16 and which constitutes the front wall of a rectangular housing 17, and the gauge 11 is in the form of an arcuate plate, on the face of which the indicia 12 are applied, and which is rigid with the free end of a lever 18 pivotally mounted on a horizontal shifter rod 19 rotatably and slidably supported in the side walls of the housing 17 to effect movement of the indicia 12 selectively into registration with the opening 16. The housing 17 has a removable rear wall 20, and is formed with a depending bracket 21 overlying an extension of the wall 20 and rigidly secured therewith, as by means of bolts 22, through the intermediary of a spacer block 23, to the front wall of a casing 24 enclosing the mechanism 15 and the drive of which it forms a part.

In the present instance, the element 13 consists of a rotary sleeve which is journaled at its rear end in a bore 25 in the spacer block 23, and which has a peripheral head 26 intermediate its ends disposed in a counterbore 27 in the front face of the block and against the rear face of the wall 20. A second peripheral head 28 on the front end of the sleeve 13 is rotatable in an opening 29 in the bracket 21 and against the front face of the split wall 20.

Secured on the periphery of the head 28 is a ball-ended pin 30 which operatively engages in a socket or notch 31 in the lower end of a lever 32 pivotally mounted intermediate its ends on a pin 33 against the inner face of the rear wall 20. The upper end of the lever 32 has a ball-ended pin 34 operatively engaging in a socket or notch 35 in the underside of a slide 36, and is arcuate to contact with the underside of the slide so as to hold the latter slidably against a track or way 37 on the underside of the top wall of the housing 17 and extending longitudinally of the rod 19. Two spaced arms 38 rigid with the slide 36 extend downwardly and forwardly therefrom, and are apertured to receive the rod 19 at opposite sides of the lever 18 and are pinned at 39 to the rod so that rotation of the sleeve 13 is effective through the lever 32 to cause the slide 36, the arms 38, the rod 19 and the lever 18 with the dial 11 to shift as a unit regardless of the angular position of the lever 18.

The element 14 preferably is in the form of an axially shiftable rod extending transversely of the rod 19. A ball-ended pin 40 projecting laterally from the front end of the rod 14 operatively engages in a socket or notch 41 in the lower end of a depending arm 42 rigid with the lever 18. Thus, axial movement of the rod 14 is effective through the arm 42 to rock the dial 11 vertically regardless of its lateral position.

Preferably, the sleeve 13 and the rod 14 are associated for selective actuation through a single hand actuator 43 having a dual movement, and in turn operate the variable-speed mechanism 15 through a common shiftable and rotatable shaft 44. To this end, the rod 14 extends through and is splined for axial movement in the sleeve 13, and constitutes the forward end of the shaft 44. Two spaced depending bracket arms 45 are formed on the front end of the sleeve 13 at opposite sides of the rod 14. The hand actuator 43, in the form of a lever, is pivotally mounted intermediate its ends, by means of a pin 46, on and between the arms 45, and has an upper ball-end 47 operatively engaging in a transverse notch 48 in the forward end of the rod 14. It will be evident that pivotal movement of the lever 43 about the axis of the sleeve 13 is effective to rotate the shaft 44 without affecting its axial position, and similarly that pivotal movement of the lever 43 about the pin 46 is effective to shift the shaft 44 axially without affecting its angular position.

A second device 49 is provided for adjusting a variable-speed mechanism 50 in the casing 24, and for indicating the selective composite adjustment thereof. The mechanisms 15 and 50 are interconnected, as for example in series, to modify each other. In the present instance, the device 49, except for the specific character of the gauge indicia, is exactly like the device 9, so that the foregoing description of the latter will suffice for both, corresponding parts of the device 49 being designated by like reference characters primed.

The variable-speed mechanism 15 in the preferred embodiment of the invention consists of a nine-speed mechanism comprising three parallel horizontal shafts 51, 52 and 53, of which the first is the power inlet shaft and the last is the outlet shaft. Five gears 54, 55, 56, 57 and 58 are rigidly secured in spaced relation on the intermediate shaft 52.

Two gears 59 and 60 are rotatably mounted against endwise movement and in spaced relation on the inlet shaft 51, and are constantly in mesh with the gears 55 and 57. The gears 59 and 60 respectively are rigid with annular toothed clutch elements 61 and 62 on their adjacent side faces. Splined for axial movement on the shaft 51 between the gears 59 and 60 is a shiftable unit comprising a gear 63 adapted when in intermediate position to mesh with the gear 56, and two annular toothed clutch elements 64 and 65 adapted for engagement respectively with the clutch elements 61 and 62 upon movement of the gear 63 to the left and right.

Rotatably mounted against endwise movement and in spaced relation on the outlet shaft 53 are two gears 66 and 67 which are constantly in mesh with the gears 54 and 58, and which are formed on their adjacent side faces respectively with two annular toothed clutch elements 68 and 69. A shiftable unit comprising a gear 70 adapted to mesh with the gear 56, and opposite end annular toothed clutch elements 71 and 72 adapted to interfit respectively with the elements 68 and 69 is splined for axial movement on the shaft 53 between the gears 66 and 67.

Thus, the nine-speed mechanism 15 consists of two three-speed mechanisms with a common intermediate shaft 52, and each with a single shiftable gear unit (63 or 70) having three operative positions. Hence, the gauge 11, to which these gear units are operatively connected, has three shiftable positions and three pivotal positions, making a total of nine composite positions, identified by the indicia 12. The indicia 12, as shown in Figs. 4 and 8, consist of the numerals 1 to 9 arranged for movement successively into registration with the opening 16 upon adjustment of the variable-speed mechanism 15 progressively into its consecutive increasing speed positions.

To establish an operative connection with the gauge 11 and the actuator 43, the gear unit 63 is embraced by a shoe 73 pivotally secured to the free end of a depending arm 74. The upper end of the arm 74 is fixed to a horizontal rock shaft 75. An upstanding arm 76 fixed on the shaft 75 engages at its free ball-end in a socket or notch 77 formed in one side of a shifter rod 78. Fixed on the shaft 44 is an upstanding arm 79 formed on its free end with a pin 80 engaging, for all axial positions of the shaft, in a transverse socket or notch 81 formed in the underside of the rod 78. Thus, pivotal movement of the actuator 43 to rotate the sleeve 13 is effective to shift the gear unit 63.

The gear unit 70 is embraced by a shoe 82 connected to the lower end of a vertical lever 83 pivotal on a fixed support. The upper ball-end of the lever 83 engages in a transverse socket or notch 84 in the underside of a shifter rod 85. Engaging in a second notch 86 in the underside of the rod 85 is a pin 87 on a horizontal arm 88 secured to a fixed vertical rock shaft 89. An arm 90 on the shaft 89 has a pin 91 engaging in a transverse notch 92 formed in the shaft 44. Thus, pivotal movement of the actuator 43 on the sleeve 13 is effective to shift the gear unit 70.

The variable speed mechanism 50 consists of two two-speed mechanisms connected in series with each other and with the mechanism 15. The first two-speed mechanism comprises a shaft 93 in axial alinement with the shaft 53 and a parallel stub shaft 94 with two fixed gears 95 and 96. Fixed and rotatable respectively on the adjacent ends of the shafts 53 and 93, and rigid on their adjacent side faces respectively with annular toothed clutch elements 97 and 98 are two gears 99 and 100 constantly in mesh respectively with the gears 95 and 96. A clutch sleeve 101 is splined for axial movement on the shaft 93 between the gears 99 and 100, and has opposite end clutch elements 102 and 103 adapted for engagement respectively with the elements 97 and 98 to connect the shafts 53 and 93 directly or indirectly through the back gears 95 and 96.

The second two-speed mechanism comprises two gears 104 and 105 respectively fixed and rotatable on the shaft 93, and constantly in mesh with two gears 106 and 107 respectively rotatable and fixed on a parallel shaft 108. The gears 105 and 106 are rigid with two annular toothed clutch elements 109 and 110. Axially splined respectively on the shafts 93 and 108 for movement in opposite directions into engagement with the elements 109 and 110 are two clutch elements or sleeves 111 and 112 connected for actuation as a unit by a single shifter shoe 113.

The clutch sleeve 101 is engaged by a shoe 114 on a shifter rod 115. A bell-crank lever pivotally mounted on a fixed support 116 has an arm 117 with a pin 118 engaging in a transverse notch 119 in the rod 115, and an arm 120 with a pin 121 engaging in an annular groove 122 in a collar 123 secured to the shaft 44'. Rigid with the collar 123 is a depending arm 124, the free end of which is notched to embrace a pin 125 on the shoe 113 in all axial positions of the shaft 44'. Thus, pivotal movement of the actuator 43' to rotate the sleeve 13' is effective to shift the clutch unit 111, 112, and pivotal movement thereof on the sleeve will shift the clutch sleeve 101.

Thus, the mechanism 50 comprises two shiftable units 101 and 111, 112, each having two positions. Hence, the gauge 11', to which these units are operatively connected, has two shiftable positions and two pivotal positions, making a total of four composite positions, indicated by the indicia 12'. These indicia consist of the letters A, B, C and D arranged for successive movement into registration with the opening 16' to indicate the available settings for progressively increasing speeds.

The gear 107 meshes with a gear 126 fixed on the shaft 127. Both of the shafts 108 and 127 may constitute machine spindles. Preferably there is a gear reduction between the shafts, a reduction of three to one in the present instance, so that the shaft 108 may be said to constitute an auxiliary spindle, and the shaft 127 may be defined as a main spindle.

The variable speed gear drive, comprising the mechanisms 15 and 50, is selectively adjustable through actuation of the two handles 43 and 43' to drive each of the spindles 108 and 127 at any one of thirty-six speeds. The speeds for the spindle 108 will be three times as great as the corresponding speeds for the spindle 127.

An index 128, preferably in the form of a plate adapted to be secured to the front wall of the casing 24 in proximity to the indicating devices 9 and 49, is shown in Fig. 8 and gives the settings for the actuators 43 and 43', as identified by the indicia 12 and 12' to obtain any particular desired speed. In its preferred form, the index plate 128 has a field divided into sub-divisions 129 arranged in horizontal and vertical cross columns 130 and 131. In the upper column 130, the numbers 1 to 9, constituting the indicia 12 are inserted in numerical order to the left. The letters A, B, C and D, constituting the indicia 12', are inserted in alphabetical order downwardly in the right end column 131. Indicia 132 representing spindle speeds in revolutions per minute are inserted in sub-divisions under the indicia 12 and 12', and represent the corresponding speeds for all available relative settings of the indicating devices 9 and 49. The arrangement of the indicia 12 and 12' on the gauges 11 and 11' are illustrated on the plate 128 so as to facilitate the adjustments necessary to obtain any particular speed.

Since there are two spindles 108 and 127, the horizontal columns 130 are divided, and comprise two rows of figures, one row applying to the main spindle 127, and the other row applying to the auxiliary spindle 108 and representing speeds three times as great.

The thirty-six speed mechanism including the variable speed mechanism 15 and the four-speed mechanism 50 for the two spindles 108 and 127, and also the specific means for adjusting the mechanisms are disclosed in my patent, No. 1,858,491 issued on May 17, 1932.

I claim as my invention:

1. In a machine tool, an indicating device comprising, in combination, a housing having a front wall with a sight opening, a gauge mounted in said housing for movement independently in two perpendicular directions across said opening, and two adjusting elements operatively connected to said gauge respectively to effect said perpendicular movements, said gauge having indicia thereon movable selectively into registration with said opening to indicate the composite relative adjustment of said elements.

2. In a machine tool, an indicating device comprising, in combination, a housing, a rod slidably mounted in said housing, a gauge mounted rotatably and non-translatably on said rod, two adjusting elements, means for rotating said gauge in accordance with the movement of one of said elements in any axial position of said rod, means for sliding said rod with said gauge in accordance with the movement of the other element in any angular position of said gauge, indicia on said gauge, and an indicator coacting with said indicia to designate the position of adjustment of said gauge.

3. In a machine tool, the combination of a drive comprising a multiple-speed mechanism having two shiftable units, a shifting member operatively connected to said units and movable in one direction to shift one of said units and in another direction to shift the other of said units, a gauge mounted for movement independently or jointly in two different directions, means operatively connecting said gauge to said member for moving said gauge in one direction on movement of said member in one direction, and means operatively connecting said gauge to said member for moving said gauge in the other direction on movement of said member in its other direction.

4. In a machine tool, the combination of a drive comprising a multiple-speed mechanism having two shiftable units, a shifting member operatively connected to said units and adapted on rotation to shift one of said units and on translation to shift the other of said units, a gauge mounted for movement independently or jointly in two different directions, means operatively connecting said gauge to said member for moving said gauge in one direction on rotation of said member, and means operatively connecting said gauge to said member for moving said gauge in the other direction on translation of said member.

5. In a machine tool, the combination of a drive comprising a multiple-speed mechanism having two shiftable units, a shifting member operatively connected to said units and adapted on rotation to shift one of said units and on translation to shift the other of said units, a gauge mounted for movement independently or jointly in two different directions, means operatively connecting said gauge to said member for moving said gauge in one direction on rotation of said member, means operatively connecting said gauge to said member for moving said gauge in the other direction on translation of said member, and a hand lever pivotally mounted on said first-mentioned means and operatively connected to said member independently of said first-mentioned means, said hand lever being movable with said first-mentioned means for rotating said member and being movable relative to said first-mentioned means for translating said member.

6. In a machine tool, an indicating device comprising, in combination, a housing, a rod slidably mounted in said housing, a bell crank rotatably and non-translatably mounted on said rod, an arcuately shaped gauge on the free end of one arm of said bell crank, said housing having a sight opening opposite said gauge, two adjusting elements, one of said elements being connected to the free end of the other arm of the bell crank for rotating said gauge past said sight opening in accordance with the movement of said one element, and means for sliding said rod for translating said gauge past said sight opening in accordance with the movement of the other element.

7. In a machine tool, an indicating device comprising, in combination, a housing, a rotatable and translatable shaft extending into said housing, a rod slidably mounted in said housing on an axis transverse to said shaft, a bell crank rotatably and non-translatably mounted on said rod, an arcuately shaped gauge on the free end of one arm of said bell crank, said housing having a sight opening opposite said gauge, the free end of the other arm of the bell crank being connected to said shaft for rotating said gauge past said sight opening in accordance with the translation of said shaft, and means connected to said shaft for sliding said rod to translate said gauge past said sight opening in accordance with the rotation of said shaft.

KEITH F. GALLIMORE.